United States Patent
Defay et al.

(10) Patent No.: US 9,791,181 B2
(45) Date of Patent: Oct. 17, 2017

(54) MODULE FOR WARMING AND, ALTERNATELY, FOR COOLING

(71) Applicant: Commissariat à l'énergie atomique et aux énergies alternatives, Paris (FR)

(72) Inventors: Emmanuel Defay, Voreppe (FR); Ghislain Despesse, Saint Egreve (FR); Neil Mathur, Cambridge (GB)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 450 days.

(21) Appl. No.: 14/286,016

(22) Filed: May 23, 2014

(65) Prior Publication Data

US 2014/0345296 A1    Nov. 27, 2014

(30) Foreign Application Priority Data

May 27, 2013 (FR) ...................... 13 54739

(51) Int. Cl.
*F25B 21/00* (2006.01)
*F25B 21/04* (2006.01)

(52) U.S. Cl.
CPC ............. *F25B 21/00* (2013.01); *F25B 21/04* (2013.01); *F25B 2321/001* (2013.01); *Y02B 30/66* (2013.01)

(58) Field of Classification Search
CPC ..... F25B 21/00; F25B 21/04; F25B 2321/001
See application file for complete search history.

(56) References Cited

U.S. PATENT DOCUMENTS

| 2,635,431 A | 4/1953 | Bichowsky |
| 4,220,906 A | 9/1980 | Drummond |

(Continued)

FOREIGN PATENT DOCUMENTS

| SU | 840621 A1 | 6/1981 |
| WO | WO2012026924 | 3/2012 |

OTHER PUBLICATIONS

Y.V. Sinyavsky, N.D Pashkov, Y.M. Gorovoy and G.E. Lugansky, "The optical ferroelectric ceramic as working boby for electrocaloric refrigeration", Ferroelectrics, 1989, vol. 90, pp. 213-217.

(Continued)

*Primary Examiner* — David Teitelbaum
(74) *Attorney, Agent, or Firm* — Occhiuti & Rohlicek LLP (57) ABSTRACT

A module for warming and, alternately, for cooling, this module comprising an electrocaloric capacitor, an electrical energy storage device and a controllable circuit for transferring electrical energy between the electrocaloric capacitor and the energy storage device. The controllable circuit comprising an inductor connected between the electrocaloric capacitor and the storage device and at least one controllable switch. There is further included a unit programmed to control the switch so as to cause the transfer circuit to toggle successively into the following states and in the following order: an energy recovery state, a disabled state in which it electrically isolates the electrocaloric capacitor and the energy storage device, an energy release state and the disabled state, and each time to maintain the transfer circuit in the disabled state for a duration greater than a predetermined threshold.

15 Claims, 5 Drawing Sheets

(56) References Cited

U.S. PATENT DOCUMENTS

| | | | |
|---|---|---|---|
| 4,453,590 A * | 6/1984 | Holliday | F24F 11/0009 |
| | | | 165/269 |
| 6,877,325 B1 | 4/2005 | Lawless | |
| 2005/0039465 A1* | 2/2005 | Welch | F25B 21/04 |
| | | | 62/3.7 |
| 2012/0056504 A1 | 3/2012 | Hunter et al. | |

OTHER PUBLICATIONS

A.F. Mischenko, Q. Zhang, J.F. Scott, R.W. Whatmore, N.D. Mathur, "*Giant electrocaloric effect in thin-film $PbZr_{0.95}Ti_{0.05}O_3$*", Mar. 3, 2006, vol. 311, science.

S.G. Lu, B.R. Rozic, Q.M. Zhang, Z.Kutnjak, Xinyu Li, E.Furman, Lee J. Gorny et al. "*Organic and inorganic relaxor ferroelectrics with giant electrocaloric effect*", Applied Physics Letters 97, 162904 (2010).

T.M. Correia, J.S. Young, R.W. Whatmore, J.F. Scott, N.D. Mathur and Q. Zhang, Applied Physics Letters 95, 182904 (2009).

S. Kar-Narayan and N.D. Mathur "*Predicted cooling powers for multilayer capacitors based on various electrocaloric and electrode materials*", Applied Physics Letters 95, 242903 (2009).

Liu et al., "Huge electrocaloric effect in Langmuir-Blodgett ferroelectric polymer thin films," New Journal of Physics, 12: 8 pages (2010).

S. Kar-Narayan and N.D. Mathur, "Direct and indirect electrocaloric measurements using multilayer capacitors," J. Phys. D: Appl. Phys. 43: pp. 1-4 (2010).

Search Report, French Application No. 1354739, dated Jan. 29, 2014 (2 pages).

\* cited by examiner

MODULE FOR WARMING AND, ALTERNATELY, FOR COOLING

RELATED APPLICATIONS

Under 35 USC 119, this application claims the benefit of the priority date of French Patent Application FR 1354739 filed on May 27, 2013, the contents of which are herein incorporated by reference.

FIELD OF INVENTION

The invention relates to a module and a method for warming and, alternately, for cooling and also to a system for thermal energy transfer incorporating this module. The subject of the invention is also a support for recording information for the implementation of the method.

BACKGROUND

It has already been suggested that it was possible to use an electrocaloric material to transfer heat between two mutually thermally insulated media. Hereafter, these two mutually thermally insulated media are called, respectively, "exterior medium" and "interior medium" or "hot medium" and "cold medium". The operating principle of such a system is described in the following article A1:

Y. V. Sinyaysky, N. D Pashkov, Y. M. Gorovoy and G. E Lugansky, "*The optical ferroelectric ceramic as working boby for electrocaloric refrigeration*", Ferroelectrics, 1989, Vol 90, pp 213-217.

This known system for transferring thermal energy between a so-called "hot" medium and a so-called "cold" medium thermally insulated from one another, comprises:
- at least one controllable module for warming and, alternately, for cooling,
- a transport device able to thermally connect the module to the hot medium when this module warms and, alternately, to the cold medium when the module cools.

In the known system, the transport device comprises a fluidic circuit containing
- an exterior heat exchanger in direct contact with the exterior medium,
- an interior heat exchanger in direct contact with the interior medium,
- a first pipe fluidically connecting an output of the exterior heat exchanger to an input of the interior heat exchanger,
- a second pipe fluidically connecting an output of the interior heat exchanger to an input of the exterior heat exchanger,
- a controllable pump able to cause the flow in one direction and, alternately, in an opposite direction, of a heat-transfer fluid inside these pipes,
- a first module for warming and, alternately, cooling the interior of the first pipe so as to cool and, alternately, warm the heat-transfer liquid which flows inside this pipe.

This known system also comprises a second module for warming and, alternately, cooling the interior of the second pipe. Each of these modules comprises an electrocaloric capacitor housed, respectively, inside the first and second pipes so as to be thermally connected with the medium to be cooled or warmed.

An electrocaloric capacitor is a capacitor which comprises two electrodes electrically and mechanically isolated from one another by a layer of electrocaloric dielectric material, However, the efficiency of the modules used in this system is low. The efficiency of a module is defined as being the ratio of the useful quantity of thermal energy produced to the quantity of electrical energy used to produce this useful quantity of thermal energy. The useful quantity of thermal energy is the quantity of thermal energy evacuated when the cooling of a medium is involved or the quantity of heat produced when the warming of a medium is involved. Because of this, the efficiency of the system is much less than that, for example, of contemporary refrigerators and the maximum Carnot efficiency.

Prior art is also known from: U.S. Pat. No. 2,635,431A, SU840621A1, WO2012026924A1, US2012/056504A1 and U.S. Pat. No. 6,877,325B1.

SUMMARY

The invention is aimed at proposing such a module, the efficiency of which is improved.

In the known modules, the electrical energy stored in the electrocaloric capacitor and which has not been used to modify the temperature of the electrocaloric material, is not reused. The module hereinabove, on the contrary, is capable of transferring this unused electrical energy to an electrical energy storage device, and then, during a following cycle, of using the electrical energy thus stored to increase the voltage between the electrodes of the electrocaloric capacitor.

Thus, in the module hereinabove, at least part of the electrical energy not used to modify the temperature of the electrocaloric material, is reused during the following cycle to increase the voltage between the electrodes of this electrocaloric capacitor. This makes it possible to very markedly improve the efficiency of the module hereinabove.

Moreover, the presence of the inductor between the electrocaloric capacitor and the storage device makes it possible to limit the energy losses in the transfer circuit and therefore to increase the efficiency of the module.

The embodiments of this module can comprise one or more of the characteristics of the dependent claims.

These embodiments of the module furthermore exhibit the following advantages:
- using a DC voltage source connected in series with the electrocaloric capacitor makes it possible to progressively charge this electrocaloric capacitor when turning on the module without resorting to significant voltages, that is to say voltages greater than 10 volts, and then, when the module is operating, to compensate the losses;
- the presence of a diode connected in parallel with the capacitor makes it possible to start up the module even if the voltage between the electrodes of the electrocaloric capacitor is zero and if the energy storage device is also empty;
- using the first and the second switches hereinabove together with the first and the second diodes hereinabove makes it possible to simplify the control since it is no longer necessary to precisely predict the instant at which the current will reverse directions in the transfer circuit so as to know the moment at which the switches must be opened;
- using a device having a storage capacity greater than or equal to that of the electrocaloric capacitor as energy storage device makes it possible to increase the efficiency since the electrocaloric capacitor can then be completely discharged, thereby maximizing the temperature variation of the electrocaloric material, using an electrocaloric capacitor as energy storage device makes it possible to warm a first medium while simultaneously cooling a second medium.

The subject of the invention is also a system for transferring thermal energy between a so-called "hot" medium and a so-called "cold" medium.

The embodiments of this system can comprise one or more of the characteristics of the dependent claims.

These embodiments of the energy transfer system furthermore exhibit the following advantages:

the use as energy storage device of another electrocaloric capacitor simplifies the embodying of the system since each electrocaloric capacitor then fulfils the following two functions:

the function consisting in cooling or in warming the heat-transfer fluid, and the function of device for storing the electrical energy to be reused;

the use of a mechanism for displacing the electrocaloric capacitor with respect to the medium to be warmed or cooled avoids having to use a heat-transfer fluid to transfer heat energy between two thermally insulated media.

The subject of the invention is also a method for warming and, alternately, cooling.

The embodiments of this method can comprise one or more of the characteristics of the dependent method claims.

Finally, the subject of the invention is also a support for recording information comprising instructions for executing the method hereinabove, when these instructions are executed by an electronic computer.

The invention will be better understood on reading the description which follows, given solely by way of non-limiting example.

DESCRIPTION OF DRAWINGS

In these figures, the same references are used to designate the same elements.

DETAILED DESCRIPTION

Hereinafter in this description, the characteristics and functions that are well known to the person skilled in the art are not described in detail.

Figure 1:
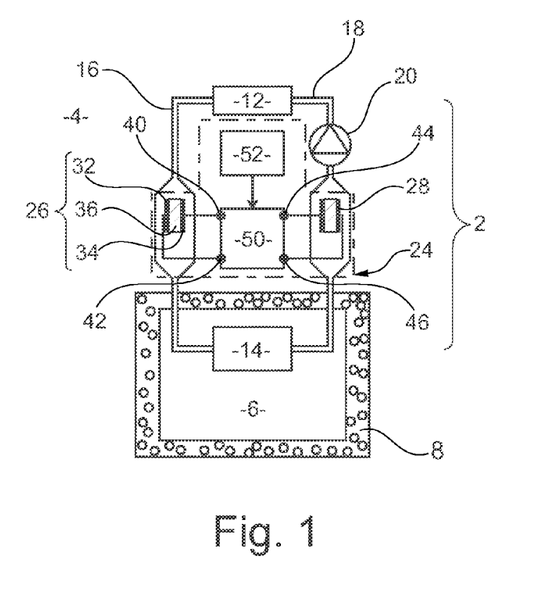
FIG. 1 is a schematic illustration of a system for transferring thermal energy between an exterior medium and an interior medium.

FIG. 1 represents a system for transferring thermal energy between an exterior medium 4 and an interior medium 6. Here, the media 4 and 6 are, for example, gaseous media. Typically, the media 4 and 6 are air.

Hereafter, the system 2 is described in the particular case where it is used to cool the medium 6 with respect to the medium 4.

The medium 6 is mechanically isolated and thermally insulated from the medium 4.

By way of illustration, the medium 6 is situated inside a casing 8. For this reason, subsequently, the medium 6 is also called "interior medium" while the medium 4 is called "exterior medium".

This casing 8 delimits an enclosure leaktight to the medium 6. Typically, the casing 8 is made of a poor thermal conducting material. Here, the expression "poor thermal conducting" material refers to materials whose thermal conductivity is typically less than 1 W·m$^{-1}$·k$^{-1}$ and, preferably, less than 0.1 W·m$^{-1}$·k$^{-1}$.

This system comprises a transport device for transporting heat from the medium 6 to the medium 4. Here, this transport device is a fluidic circuit comprising:

an exterior heat exchanger 12 directly in mechanical contact with the medium 4, an interior heat exchanger 14 directly in mechanical contact with the medium 6, pipes 16, 18 fluidically inter-linking the exchangers 12 and 14, a heat-transfer fluid which flows inside the exchangers 12, 14 and pipes 16,18, and a pump 20 for causing the flow, in one direction and, alternately, in the opposite direction of the heat-transfer fluid inside the pipes 16 and 18.

The exchangers 12 and 14 are designed to allow efficient heat exchange between the medium in which it is immersed and the heat-transfer fluid. For example, they each comprise a radiator with fins.

Here, the exchangers 12 and 14 are immersed, respectively, in the media 4 and 6. The exchanger 14 is therefore situated inside the casing 8 while the exchanger 12 is situated outside this casing 8.

Each exchanger comprises a heat-transfer fluid input and output. Here, the input of the exchanger 12 is directly connected fluidically by the pipe 18 to the output of the exchanger 14. The input of the exchanger 14 is directly connected fluidically to the output of the exchanger 12 by way of the pipe 16.

The pipes 16 and 18 pass through a wall of the casing so as to fluidically inter-connect the exchangers 12 and 14.

The heat-transfer fluid is for example a liquid whose volumetric thermal capacity is greater than 2000 kJ·m$^{-3}$·K$^{-1}$. It is for example water.

The pump 20 controls the direction of flow of the heat-transfer fluid inside the pipes 16 and 18. Here, this pump 20 is connected to the pipe 18.

In this particular embodiment, when the heat-transfer fluid situated inside the pipe 16 must be warmed, the heat-transfer fluid situated inside the pipe 18 must be cooled and vice versa. For this purpose, the system 2 comprises a single module 24. The module 24 comprises two electrocaloric capacitors 26 and 28 electrically linked to one another by way of a controllable electrical energy transfer circuit 50. Here, these capacitors 26 and 28 are used to cool and, alternately warm the heat-transfer fluid which flows, respectively, inside the pipes 16 and 18. For example, for this purpose, the capacitors 26 and 28 are housed in the interior, respectively, of the pipes 16 and 18.

In this embodiment, apart from this difference in location, the capacitors 26 and 28 are structurally identical. Thus, hereafter, the capacitor 26 alone is described in detail.

Figure 2:
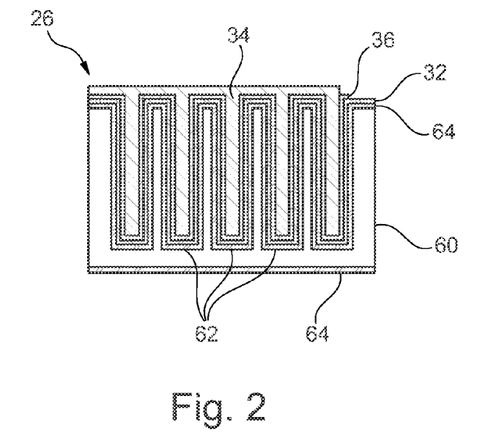
FIG. 2 is a vertical sectional and schematic illustration of an electrocaloric capacitor used in the system of FIG. 1.

The structure of the capacitor 26 is only represented schematically in FIG. 1. A more detailed embodiment of this structure is represented in FIG. 2.

The capacitor 26 comprises two metallic electrodes 32, 34 isolated mechanically and electrically from one another by a dielectric material layer 36. In addition to being made of a good electrical conductor material, the electrodes 32 and 34 are also made of a good thermal conducting material. In this description, it is considered that a material is a good thermal conductor if its thermal conductivity at 22° C. is greater than 2 W·m$^{-1}$·K$^{-1}$ and, preferably, greater than 10 or 50 W·m$^{-1}$·K$^{-1}$. For example, the electrodes 32, 34 are made of metal such as platinum, nickel, gold, copper, silver or palladium. As a variant, these electrodes are produced with the aid of an oxide-based alloy. For example, preferably, the electrodes are produced from $RuO_2$, $SiRuO_3$, $IrO_3$ or $LaNiO_3$. Indeed, the oxygen saturation of these electrodes makes it possible to limit the fatigue and the wear of the capacitor.

The electrodes 32 and 34 take the form of a layer of substantially constant thickness $e_e$. Typically, the thickness $e_e$ is greater than 10 nm or 0.1 μm and less than 10 μm or 5 μm.

At least one of these electrodes 32, 34 and, preferably both electrodes, are in conduction thermal contact with the heat-transfer fluid which flows inside the pipe 16. It is considered that there is conduction thermal contact:
a) if the electrode is directly in mechanical and thermal contact with the heat-transfer fluid, or
b) if the electrode is thermally linked to the heat-transfer liquid by way of a good thermal conducting material.

In this embodiment, the electrodes 32, 34 are directly in mechanical contact with the heat-transfer liquid situated inside the pipe 16.

To make it possible to cool the heat-transfer liquid, the layer 36 is made of a material which is both dielectric and electrocaloric. An electrocaloric material is a material whose temperature changes abruptly in response to the application of an electric field. More precisely, an electrocaloric material is a material whose temperature variation is a function, typically a bijective function, of the absolute value of the electric field.

Figure 3:
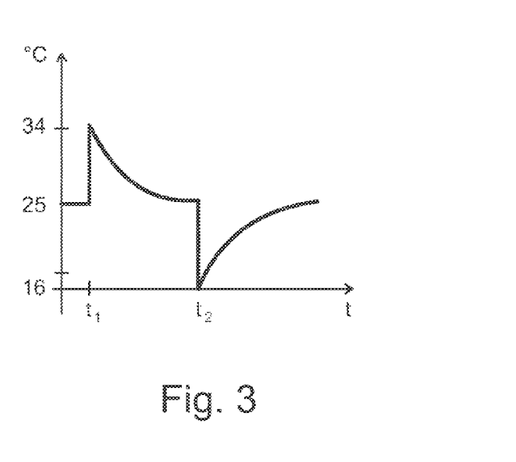
FIG. 3 is a timechart of the evolution of the temperature of an electrocaloric material of the capacitor of FIG. 2 over time.

The behaviour of a positive electrocaloric material in response to the electric field is illustrated in FIG. 3. The temperature of the material is initially equal to the ambient temperature, that is to say in the case illustrated in FIG. 3 to 25° C. In the initial state, the electrocaloric material is not placed inside an electric field.

At the instant $t_1$, an electric field is applied. This immediately causes an increase ΔT in the temperature of this material of several degrees. In the case illustrated, ΔT is equal to 9° C. Thereafter, the electric field is maintained constant between the instants $t_1$ and $t_2$. Under these conditions, the temperature of the electrocaloric material decreases through heat exchange with the exterior environment until its temperature becomes equal to the ambient temperature of the exterior environment.

At the instant $t_2$, the electric field is removed when the temperature of the electrocaloric material has again become equal to the ambient temperature. In response, the temperature of the electrocaloric material immediately falls by −ΔT. Thereafter, the temperature of the electrocaloric material increases by heat exchange with the exterior environment until it again becomes equal to the ambient temperature. We have then returned to the initial state. As illustrated by the diagram of FIG. 3, an electrocaloric material is therefore usable to warm and, alternately, cool the heat-transfer fluid temporarily.

Here, the electrocaloric material whose operation has just been described is a "positive" electrocaloric material, that is to say its temperature increases when an electric field is applied. There also exist negative electrocaloric materials whose temperature decreases when an electric field is applied. In this embodiment, the layer 26 is made of a positive electrocaloric material.

Electrocaloric materials have been well known for a long time. However, it has only recently been discovered that it was possible to considerably improve the performance of these electrocaloric materials if they were used in the form of thin layers. Here, it is considered that a material layer is thin if its thickness is less than 500 μm or 50 μm and, preferably, less than 15 μm or 10 μm or 5 μm. Reference may be made in this regard to the following article A2:

A. F. Mischenko, Q. Zhang, J. F. Scott, R. W. Whatmore, N. D. Mathur, "*Giant electrocaloric effect in thin-film $PbZr_{0.95}Ti_{0.05}O_3$*", 3 Mar. 2006, volume 311, science.

More recently still, it has been demonstrated that it was possible to attain temperature variations ΔT of close to 40° C. in certain electrocaloric materials. Reference may be made in this regard to the following article A3:

S. G. Lu, B. R. Rozic, Q. M. Zhang, Z. Kutnjak, Xinyu Li, E. Furman, Lee J. Gomy et al. "*Organic and inorganic relaxor ferroelectrics with giant electrocaloric effect*", Applied Physics Letters 97, 162904 (2010).

In this description, it is considered that the layer 36 is made of electrocaloric material if its maximum temperature variation ΔTmax in response to an electric field is at least 5° C. and, preferably, at least 10° C.

The temperature variation $\Delta T_{max}$ occurs in proximity to a temperature, here called the "transition temperature". This transition temperature is different for each electrocaloric material. The transition temperature of each electrocaloric material is known. For example, reference may be made in this regard to table 1 of article A3 for a few examples of values of transition temperature.

Here, the material of the layer 36 is chosen to exhibit a transition temperature equal to a temperature $T_a$ to within plus or minus 5 or 2.5 or one time the variation $\Delta T_{max}$ of this material. The temperature $T_a$ is chosen as a function of the temperatures $T_e$ and Tdi, respectively, of the media 4 and 6, that are normally encountered during the use of the system 2. For example, the temperature $T_a$ is chosen equal to the temperature $T_i$ or to the temperature $T_e$ or to the average of the temperatures $T_e$ and $T_i$. Here, it is therefore assumed that this temperature $T_a$ is equal to 25° C. By way of illustration only, this may therefore lead to choosing $[Pb(Mg_{1/3}Nb_{2/3})O_3]_{0.93}$—$[PbTiO_3]_{0.07}$ as electrocaloric material. This material is for example described in greater detail in the following article A4:

T. M. Correia, J. S. Young, R. W. Whatmore, J. F. Scott, N. D. Mathur and Q. Zhang, Applied Physics Letters 95, 182904 (2009).

However, for other temperatures $T_a$, other choices are possible for the electrocaloric material. Typically, the electrocaloric material of the layer 36 is chosen from the group composed of:

Pb(Zr,Ti)O$_3$ known by the acronym PZT,
(Pb,La)(Zr,Ti)O$_3$ known by the acronym PLZT,
Pb(Mg,Nb,Ti)O$_3$ known by the acronym PMN-PT,
(Ba,Sr)TiO$_3$ known by the acronym BST,
SrBi$_2$Ta$_2$O$_9$ known by the acronym SBT,
PVDF (Polyvinylidene fluoride) such as P(VDF-TrFE) or P(VDF-TrFE-CFE).

To have a large capacity to absorb heat with a thin layer of electrocaloric material, it has been proposed to arrange the electrodes 32 and 34 and the layer 36 in the form of a multilayer capacitor better known by the acronym MLC. Reference may be made in this regard to the following article A5:

S. Kar-Narayan and N. D. Mathur, "*Predicted cooling powers for multilayer capacitors based on various electrocaloric and electrode materials*", Applied Physics Letters 95, 242903 (2009).

Here, the capacitor 26 is a multilayer capacitor the thickness of whose layer 36 is less than 5 or 2 nm. For example, the thickness of the layer 36 lies between 10 nm and 10 µm and, preferably, between 10 nm and 2 µm or between 100 nm and 2 µm.

The electrodes 32 and 34 of the capacitor 26 are electrically connected to terminals 40, 42 of the circuit 50. The electrodes 32 and 34 of the capacitor 28 are electrically connected to terminals 44, 46 of this circuit 50.

The capacitors 26 and 28 also operate as conventional capacitors and are therefore capable of storing electrical energy. The quantity of electrical energy stored in each of these $$\int_{E_{min}}^{E_{max}} \varepsilon * E dE$$

capacitors is typically approximately equal to:
where:
$E_{max}$ and $E_{min}$ are, respectively, the maximum and minimum values of the electric field E applied between the electrodes 32 and 34,
$\in$ is the dielectric constant of the layer 36, $\in$ may depend on the applied electric field,
E is the "electric field" variable.

The circuit 50 makes it possible to transfer at predetermined instants the electrical energy stored in the capacitor 26 to the capacitor 28 and vice versa. For this purpose, the circuit 50, in response to commands, can be toggled between the following three states:
an electrical energy recovery state,
a disabled state, and
an electrical energy release state.

In the electrical energy recovery state, the electricity stored in the capacitor 26 is transferred to the capacitor 28. Accordingly, switches of the circuit 50 are controlled so as to permit solely the flow of the current from the capacitor 26 to the capacitor 28. This electrical energy transfer thus causes a drop in the voltage between the electrodes of the capacitor 26 and an increase in the voltage between the electrodes of the capacitor 28. A fall in the temperature of the electrocaloric material of the capacitor 26 and an increase in the temperature of the electrocaloric material of the capacitor 28 are therefore obtained simultaneously.

In this state, part of the electrical energy stored in the capacitors is used to modify the temperature of the electrocaloric materials. Today, it is estimated that about 5% of the electrical energy provided to electrocaloric capacitors is used to cool or warm the electrocaloric materials. The remainder of the electrical energy provided to electrocaloric capacitors remains in the form of electrical energy.

In the disabled state, the capacitors 26 and 28 are electrically isolated so as to store electrical energy between their respective electrodes. Therefore no electric current passes through them and no electric current flows between the capacitors 26 and 28. In this disabled state, the decrease in the energy stored in each of the capacitors is due solely to the imperfections of these capacitors such as, for example, the existence of a leakage resistance between the electrodes of the capacitors.

In the recovery state, the electrical energy stored in the capacitor 28 is transferred to the capacitor 26. This causes an increase in the voltage between the electrodes 32 and 34 of the capacitor 26 and, simultaneously, a decrease in the voltage between the electrodes of the capacitor 28. Thus, an increase in the temperature of the electrocaloric material of the capacitor 26 and, at the same time, a decrease in the temperature of the electrocaloric material of the capacitor 28 is therefore obtained. Accordingly, the circuit 50 is controlled so as to permit the flow of the current solely from the capacitor 28 to the capacitor 26.

A more detailed embodiment of the circuit 50 is described with reference to FIG. 4. To control the circuit 50, the system 2 also comprises a control unit 52.

FIG. 2 represents in greater detail an embodiment of the capacitor 26. The capacitor 26 comprises a substrate 60 extending essentially in a horizontal plane. Vertical trenches 62 are etched from the upper face of the substrate 60. For example, the substrate 60 is a plane substrate made of silicon. The width of the trenches 62 is typically between 0.5 and 30 µm and, preferably, less than 5 or 2 µm. Here, the widths of the trenches are equal to 1 µm. The horizontal cross-section of the trenches 62 may be arbitrary. For example, it may be circular or rectangular.

The depth of the trenches is typically between 1 µm and 500 µm and, preferably, between 50 µm and 100 µm. Here, the depth is equal to 100 µm.

A barrier layer 64 is deposited inside the trenches 62 to prevent the undesired diffusion of chemical species towards the substrate 60. For example, the barrier layer 64 is produced by thermal oxidation of the substrate 60. The thickness of this barrier layer 64 is typically between 10 nm and 5 µm and, preferably, between 50 nm and 150 nm. Here, the thickness is equal to 100 nm.

The electrode 32 is deposited on the barrier layer 64. Here, the thickness of the electrode 32 is between 10 nm and 5 µm. In this case, it is equal to 100 nm.

The electrocaloric material layer 36 is deposited on the electrode 32. Here, the thickness of the layer 36 is between 10 nm and 5 µm.

The electrode 34 is deposited on the layer 36.

The electrode 34 and the layer 36 are partially etched so as to lay bare a portion of the electrode 32 and thus allow its electrical connection to the terminal 42.

Figure 4:
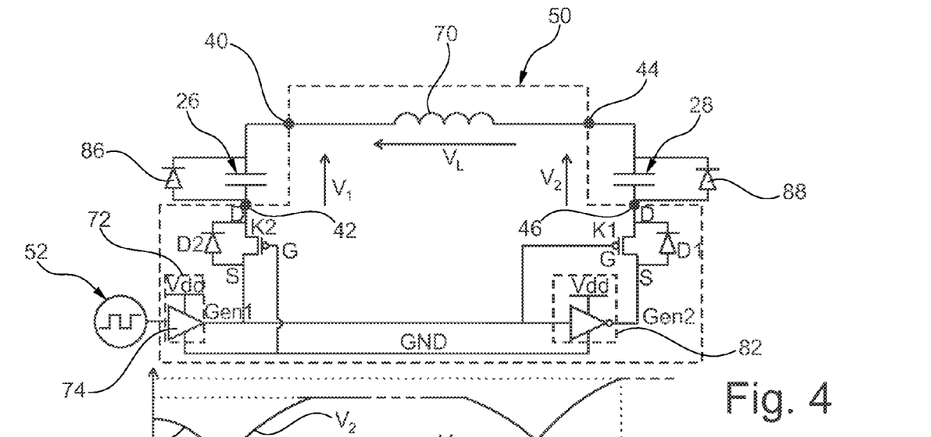
FIG. 4 is a simplified electronic diagram of a transfer circuit used in the system of FIG. 1.

FIG. 4 represents an exemplary embodiment of the circuit 50 and of the control unit 52.

The circuit 50 comprises an inductor 70 directly connected between the terminals 40 and 44. By virtue of this inductor 70, the circuit 50 combined with the capacitors 26 and 28 forms an LC circuit. This limits the electrical energy losses during the transfer of this energy between the capacitors to less than 10% of the electrical energy transferred. Typically, the electrical energy losses are less than 5% and, preferably, less than 2% of the electrical energy transferred.

The value of the inductor 70 is chosen as a function of the capacitances of the capacitors 26 and 28 so that the time taken to discharge these capacitors is typically greater than 10 µs and, preferably, greater than 30 µs.

The value of the inductor 70 can also be chosen so as to limit the intensity of the current i which passes through it.

A controllable switch K2 is directly connected electrically between the terminal 42 and an output of a controllable DC voltage source 72. This switch K2 is switchable, in response to a command, between an open position in which it opposes the passage of the electric current and a closed position in which it allows the current i to pass. Subsequently, when a switch is switched from its closed position to its open position, the switch is said to have been opened. Conversely, when the switch is switched from its open position to its closed position, this switch is said to have been closed.

In this particular embodiment, the switch K2 is a PMOS ("P-channel Metal-Oxide-Semiconductor Field-Effect Transistor") transistor whose source S is connected directly to the output of the voltage source 72 and whose drain D is connected directly to the terminal 42. The gate G of this transistor is connected directly to the ground GND.

A diode D2 is connected between the drain and the source of the switch K2. The cathode of this diode D2 is connected directly to the terminal 42. The diode D2 may be the spurious diode which exists between the source and the drain of a PMOS transistor. It may also be an additional diode connected between the source and the drain of the PMOS transistor.

The voltage source 72 is produced here with the aid of an amplifier 74 whose output Gen1 is connected directly to the source of the switch K2. This amplifier 74 is supplied via a reference potential $V_{dd}$ strictly greater than zero.

The input of the amplifier 74 is connected to an output of the control unit 52. Under these conditions, the source 72 generates a DC voltage on the output Gen1 proportional to the control signal generated by the unit 52.

A controllable switch K1 is directly connected between the terminal 46 and an output Gen2 of a controllable voltage source 82. Here, the switch K1 is structurally identical to the switch K2. Its drain D is connected directly to the terminal 46 and its source S directly connected to the output Gen2. Its gate G is connected directly to the output Gen1 of the voltage source 72.

The source 82 is controlled by the unit 52. For this purpose, here, it is produced like the source 72 except that the amplifier used is an inverting amplifier. The input of this inverting amplifier is connected directly to the output Gen1 so as to generate on the output Gen2 a voltage phase-shifted by 180° with respect to the voltage present on the output Gen1.

Figure 5:
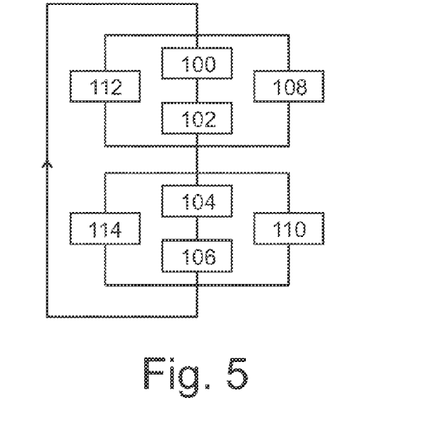
FIG. 5 is a flowchart of a method for transferring thermal energy between an exterior medium and an interior medium with the aid of the system of FIG. 1.

The unit 52 is programmed to execute the method of FIG. 5. The expression "programmed" refers to an implementation of the program either in hardware form or in software form. Here, the unit 52 is a generator of a clock signal. This clock signal is a periodic signal whose waveform is a rectangular or slot-like signal. Such a signal comprises a succession of crests during which the DC voltage generated is constant and strictly greater than zero. In this signal, two immediately consecutive crests are separated only by a valley during which the voltage is zero. Here, the duration of the crests is chosen equal to the duration of the valleys. Under these conditions, the duty ratio of the control signal is then equal to 0.5.

The period T of the control signal is strictly greater than 100 ms and, preferably, greater than 1 s or 5 s or 10 s in such a way that the disabled state lasts more than 100 ms and, preferably, more than 1 s or 5 s or 10 s. Indeed, a fairly long duration for the disabled state is required in order to allow the capacitors 26, 28 the time required to cool or warm the heat-transfer fluid.

Here, the unit 52 also controls the pump 20 so as to:

cause the heat-transfer fluid to flow from the exchanger 12 to the exchanger 14 through the pipe 16 solely when the temperature of the capacitor 26 is less than the temperature $T_e$, and to cause the heat-transfer fluid to flow from the exchanger 12 to the exchanger 14 through the pipe 18 solely when the temperature of the capacitor 28 is less than the temperature $T_e$.

Finally, diodes 86 and 88 are connected in parallel, respectively, with the capacitors 26 and 28. The function of these diodes 86 and 88 is to prevent the voltage between the electrodes of these capacitors 26 and 28 from becoming negative. The cathode of the diodes 86 and 88 is connected directly to the inductor 70.

The operation of the system 2 will now be described with the aid of the method of FIG. 5 and of the timecharts of FIGS. 6 to 9.

Figures 6, 7:
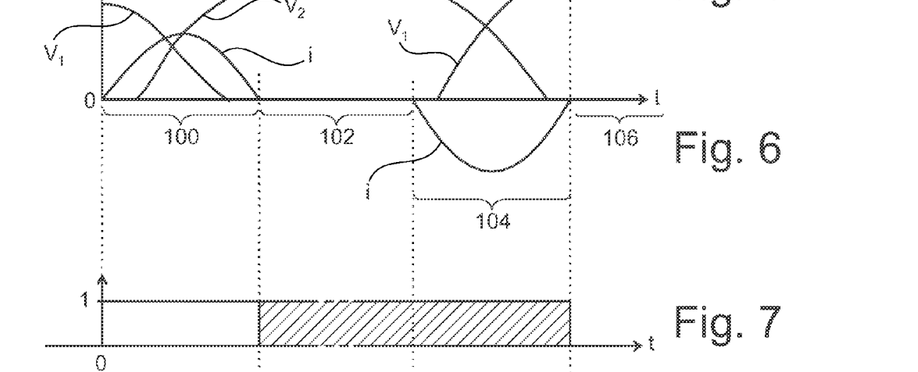
FIG. 6 is a timechart illustrating the evolution over time of various voltages and intensity measurable in the system of FIG. 1.
FIGS. 7 and 8 are timecharts illustrating the instant at which respective switches must be opened and closed.

FIG. 6 represents, for a control cycle, the evolution over time of the intensity of the current i and of the voltages $V_1$ and $V_2$, respectively, between the electrodes of the capacitors 26 and 28.

Figure 8:
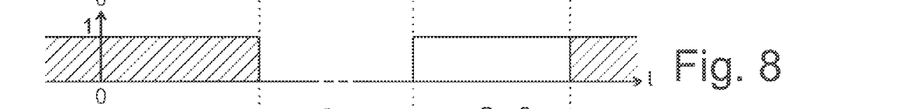

The chronology of the commands of the switches K1 and K2 are represented in the figures, respectively, 7 and 8. In these figures, the values 0 and 1 correspond, respectively, to the open and closed positions of the switch. The hatched zones indicate the zones where the open or closed position of the switch is of no significance.

The control cycle starts with a step 100 during which the unit 52 commands the closing of the switch K1 when the capacitor 26 is charged and the capacitor 28 is discharged. This makes it possible to toggle the circuit 50 into the recovery state. Accordingly, here, a negative gate-source voltage $V_{GS}$ is applied between the gate and the source of the switch K1 to close it. In response, the capacitor 26 discharges through the inductor 70 and the capacitor 28 charges. The current i flows through the diode D2 and the switch K1. The voltage $V_1$ between the electrodes of the capacitor 26 decreases and the voltage $V_2$ between the electrodes of the capacitor 28 increases. Consequently, the temperature of the layer 36 of the capacitor 26 decreases and the temperature of the layer 36 of the capacitor 28 increases.

In the recovery state, if the voltage $V_1$ becomes negative, the diode 86 begins to conduct to maintain the voltage $V_1$ equal to zero. In a similar manner, the diode 88 begins to conduct to prevent the appearance of a negative voltage $V_2$ between the electrodes of the capacitor 28.

When the capacitor 26 has finished discharging, the intensity of the current i vanishes since the switch K2 is in its open position and the diode D2 prevents the current i from changing direction. The disabled state is thus entered automatically, during a step 102, when the capacitor 26 has finished discharging. In this disabled state, the position of the switch K1 is of no significance since it is the diode D2 which prevents the flow of the current i. On the other hand, the switch K2 must be in its open position. Indeed, just the passing of the switch K2 from its open position to its closed position makes it possible to discharge the capacitor 28 to the capacitor 26.

The duration of step 100 is very short, that is to say it lasts less than 100 ms and, typically, less than 1 ms or 100 µs. Its duration is therefore insufficient to allow the capacitor 26 to cool, by thermal transfer, the heat-transfer fluid situated inside the pipe 16. Hence, to allow this, the circuit 50 remains in the disabled state for a duration of greater than 100 ms and, preferably, greater than 1 s, 5 s or 10 s. Here, throughout step 102, the unit 52 maintains the circuit 50 in the disabled state for a duration sufficient for the temperature of the capacitor 26 to be balanced with the temperature of the heat-transfer fluid which flows inside the pipe 16. It is considered here that the temperatures are balanced if they are equal to within plus or minus 20% and, preferably, to within plus or minus 10%. In FIGS. 6 to 9, the dots on the time axis during the disabled states indicate that the complete duration of the disabled state has not been represented.

During a step 104, the disabled state is terminated by closing the switch K2. Accordingly, for example, a voltage $V_{GS}$ between the gate and the source of the switch K2 equal to $-V_{dd}$ is applied. The release state, in which the energy stored in the capacitor 28 is released to the capacitor 26, is then entered. The closing of the switch K2 causes the flow of the current i from the capacitor 28 to the capacitor 26 through the diode D1 and the switch K2.

This also causes a fall in the voltage $V_2$ and an increase in the voltage $V_1$ and therefore a fall in the temperature of the layer 36 of the capacitor 28 and an increase in the temperature of the layer 36 of the capacitor 26.

As long as the current flows from the capacitor 28 to the capacitor 26, the position of the switch K1 is of no significance since it is the diode D1 which conducts. On the other hand, at the latest at the next instant at which the intensity of the current i vanishes, the switch K1 must be open so as to prevent the capacitor 28 from beginning to charge again immediately after having discharged. Here, the switch K1 switches into its open position at the same time as the switch K2 switches into its closed position, that is to say at the start of step 104.

Under these conditions, at the next instant at which the current i vanishes, the diode D1 interrupts the flow of the current i. Toggling to a new disabled state of the circuit 50 is therefore effected automatically, during a step 106. Typically, the duration of step 104 and therefore of the release state is strictly less than 100 ms and, often, less than 1 ms or 100 µs. To exit this disabled state and return to step 100, it is necessary to close the switch K1. During step 106, the circuit 50 is maintained in this disabled state for a duration of greater than 100 ms and preferably of greater than 1, 5 or 10 s. Here, the circuit 50 is maintained in this disabled state for a duration equal to the duration of step 102. Thereafter, the method returns to step 100.

Throughout the duration of step 106, the position of the switch K2 is of no significance. Here for example, the switch K2 is in its closed position.

The succession of steps 100, 102, 104 and 106 forms a complete cycle of energy transfer between the capacitors 26, 28.

In parallel with steps 100 and 102, during a step 108, the unit 52 controls the pump 20 so as to cause the flow of the heat-transfer fluid in the pipe 16 from the exchanger 12 to the exchanger 14. Thus, the heat-transfer fluid cools in contact with the capacitor 26 and attains a lower temperature than that of the medium 6. Thereafter, the heat-transfer fluid thus cooled passes through the exchanger 14 so as to cool the medium 6 in its turn.

In parallel, the heat-transfer fluid flows, in the pipe 18, from the exchanger 14 to the exchanger 12. During this flow, the heat-transfer fluid warms in contact with the capacitor 28 and attains a higher temperature than that of the medium 4. This heat-transfer fluid thus warmed is thereafter cooled when it passes through the exchanger 12 and attains, on output from the exchanger 12, a constant temperature equal to that of the medium 4.

In parallel with steps 104 and 106, during a step 110, the unit 52 commands the pump 20 to reverse the direction of flow of the heat-transfer fluid. Hence, it flows in the pipe 16 by circulating from the exchanger 14 to the exchanger 12. The operation of the system 2 during this step 110 is identical to that described during step 108 except that the capacitor 28 cools the calorific fluid and the capacitor 26 warms it. Moreover, since the direction of flow of the calorific fluid has been reversed, the cooled calorific fluid still flows from the medium 4 to the medium 6, thereby making it possible to continue to cool this medium 6 and to maintain this medium 6 at a temperature below that of the medium 4.

The divergence between the temperature $T_i$ of the medium 6 and the temperature $T_e$ of the medium 4 is dependent on the amplitude of the temperature variation of the electrocaloric material layer 36.

The unit 52 also controls the voltage sources 72 and 82 so that they recharge the capacitors 26 and 28. For this purpose, they generate solely a voltage having the same direction as the current i. Here, the value of the voltages $V_1$ and $V_2$ and the duration of supply is chosen, during startup of the module 24, so as to progressively charge these capacitors 26 and 28 even if these capacitors were initially completely discharged. Thereafter, the voltages $V_1$ and $V_2$ make it possible to compensate for the electrical energy losses during the operation of the module 24. These electrical energy losses are essentially of two types, namely:

the electrical energy losses caused by the imperfections of the electronic components used for the transfer of the electrical energy between the capacitors 26 and 28, and the electrical energy losses caused by the fact that part of this electrical energy is used by the capacitors 26 and 28 to modify the temperature of their electrocaloric material layer.

Here, in parallel with step 100, during a step 112, the unit 52 controls the source 72 so that it generates a positive voltage throughout the duration of step 100. Thereafter, this control can also be maintained throughout the duration of step 102. This is of no significance since during step 102, the intensity of the current i is zero. In this particular embodiment, the control of the source 72 is therefore maintained until the start of step 104.

In parallel with step 104, during a step 114, the unit 52 controls the source 82 to generate a voltage $V_2$ of strictly greater than zero throughout the duration of step 104. This makes it possible to recharge the capacitor 28. Thereafter, this control of the source 82 can be maintained throughout step 106. As previously, this is of no significance since the intensity of the current i is zero during step 106. Here, this control is therefore maintained until the start of step 100.

Figure 9:
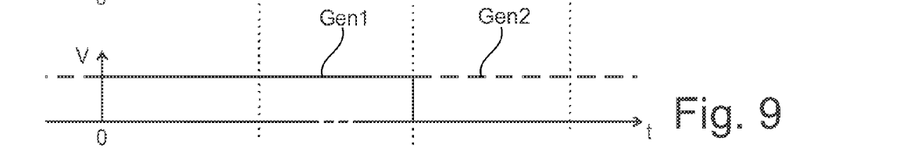
FIG. 9 is a timechart illustrating the evolution over time of the output voltage of two controllable DC voltage sources.

The timechart of the voltages generated by the sources 72 and 82 is represented in FIG. 9. The signal Gen1 corresponds to the signal generated on the output of the source 72 and the signal Gen2 corresponds to the signal generated on the output of the source 82.

Figure 10:
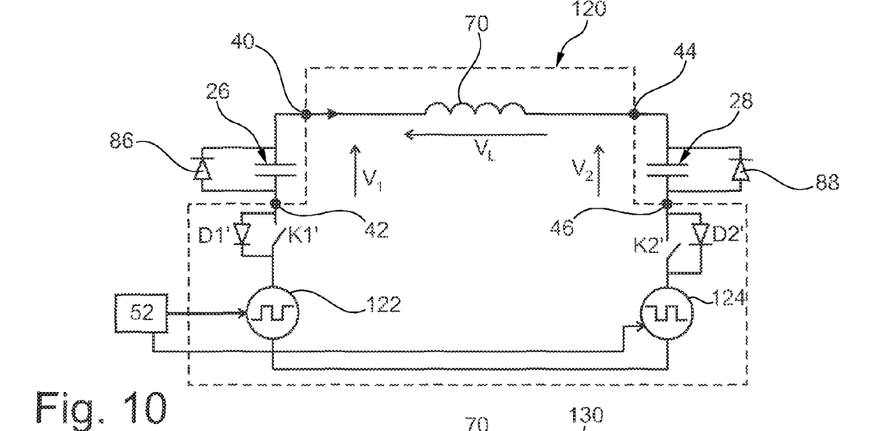
FIGS. 10 and 11 are schematic illustrations of two other possible embodiments of the transfer circuit of FIG. 4.

FIG. 10 represents a transfer circuit 120. This circuit 120 is identical to the circuit 50 except that:
the sources 72 and 82 are replaced with controllable DC voltage sources 122 and 124,
the switches K1 and K2 are replaced, respectively, with switches K1' and K2', and
the diodes D1 and D2 are replaced, respectively, with diodes D1' and D2'.

The sources 122 and 124 are controllable independently of one another, unlike the sources 72 and 82. This allows finer management of the charging of the capacitors 26 and 28. For example, the source 122 generates a voltage of strictly greater than zero only for part of the duration of step 100, rather than throughout the duration of this step. The source 122 can also be controlled so as to charge the capacitor 26 at a strictly lower frequency than that of the cycles of energy transfer between the capacitors 26 and 28. For example, the source 122 is controlled so as to charge the capacitor 26 only every two or every three cycles. The source 124 is controlled in a manner similar to the source 122.

Here, the position of the switches K1', K2' and of the diodes D1' and D2' is reversed with respect to the positions, respectively, of the switches K1, K2 and of the diodes D1 and D2 of the circuit 50. Consequently, the switches K1' and K2' are directly connected, respectively, to the terminals 42 and 46. The anode of the diodes D1' and D2' is directly connected, respectively, to the terminals 42 and 46.

In this embodiment, the switches K1' and K2' are controllable independently of one another. Thus, the switches K1' and K2' may be simultaneously open during steps 102 and 106 or K1' may be open solely at the end of step 104. In this embodiment, the switches K1' and K2' are not necessarily PMOS transistors. For example, they may be IGBT transistors ("insulated-gate bipolar transistors") or other types of controllable switches such as mechanical relays. In this embodiment, typically, the diodes D1' and D2' are diodes added to the terminals of the controllable switches and not spurious diodes of these switches.

The operation of the transfer circuit 120 and its control is deduced from the explanations given with reference to the method of FIG. 5.

Figure 11:
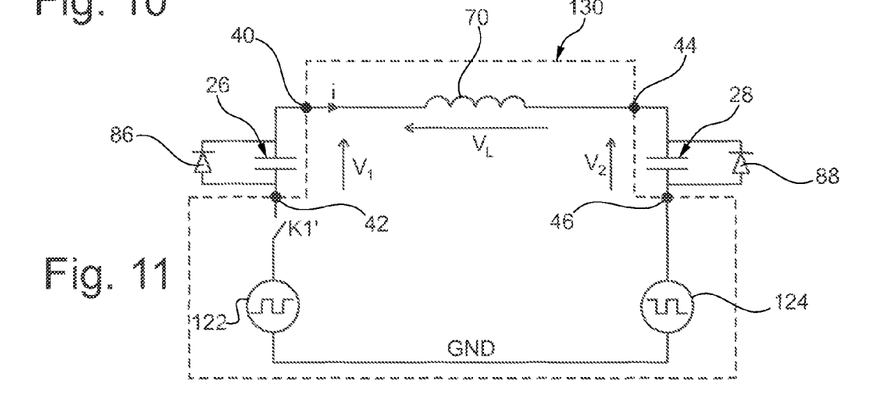
Figures 12, 13:
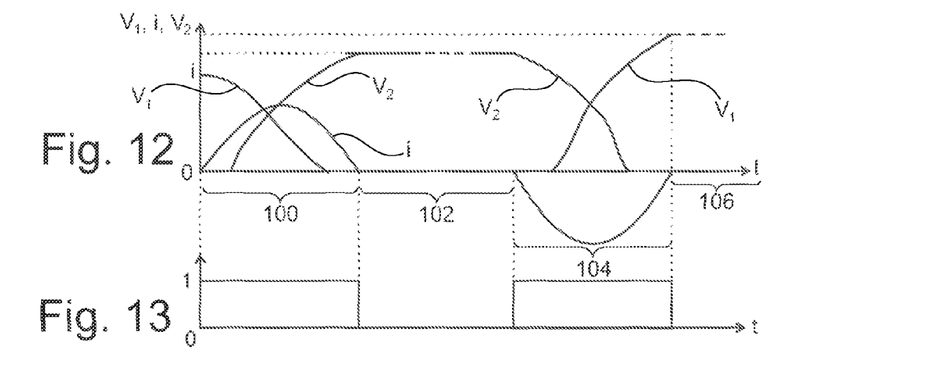
FIGS. 12 and 13 are timecharts illustrating, respectively, the evolution over time of voltages and of the intensity of a current in the transfer circuit of FIG. 11 and the instants of control of a switch of the transfer circuit of FIG. 11.

FIG. 11 represents a transfer circuit 130 identical to the circuit 120 except that the diodes D1', D2' and the switch K2' are omitted. Since these diodes D1', D2' and the switch K2' are omitted, toggling to the disabled state when the capacitor 26 or 28 has finished discharging does not occur automatically but must be prompted by the opening of the switch K1'. To obtain the waveforms of the voltages $V_1$, $V_2$ and of the intensity of the current i that are represented in FIG. 12, it is necessary to control the opening and the closing of the switch K1' as represented on the timechart of FIG. 13. Here, the waveforms represented in FIG. 12 are identical to those represented in FIG. 6.

This embodiment of the transfer circuit is simpler. However, it is not easy to determine the precise instant at which the intensity of the current i vanishes. Thus, control of this circuit 130 may turn out to be more complex than that of the circuit 50.

Figure 14:
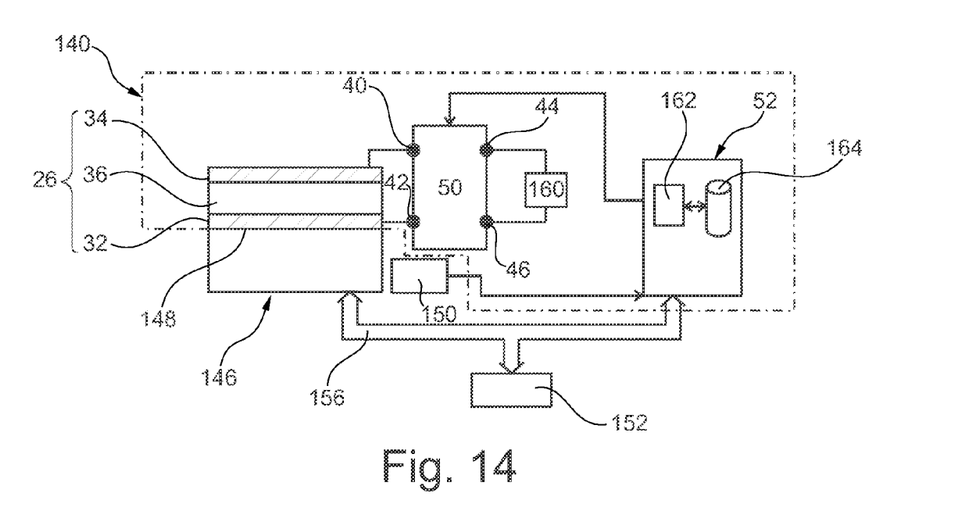
FIG. 14 is a schematic illustration of a module used to limit the temperature variations of an electronic component.

FIG. 14 represents a module 140 for warming and, alternately, cooling an electronic component 146 so as to limit the amplitude of the temperature variations of this component.

The component 146 is here an electronic component and, for example, an integrated circuit. Typically this integrated circuit comprises a multitude of controllable electronic switches each able to switch between an open position and a closed position to carry out a predefined function. In the open position, the switch allows the current to pass with difficulty. Conversely, in the closed position, the switch allows the current to pass with ease. Upon each switching between the open and closed positions, part of the electrical energy received by the switch is transformed into heat. In the closed position, part of the energy which passes through the switch can also be transformed into heat if this switch exhibits a non-zero resistance in this position. Consequently, the component 146 produces heat when it is used. Conversely, it does not produce any when it is not used.

When the component 146 must be cooled, it is said to be in the active state. On the contrary, when the component 146 can be warmed, it is said to be in the passive state. Toggling between these passive and active states is detected on the basis of acquired values of the quantity Q of heat produced per second by the component 146 and/or on the basis of acquired values of the temperature T of the component 146. In this embodiment, the active state is detected when the component 146 produces a quantity Q of heat per second that is greater than a predetermined threshold $Q_1$, expressed in Watts, and when its temperature T is greater than a predetermined threshold $T_1$. On the contrary, when the component 146 produces a quantity Q of heat per second that is less than this threshold $Q_1$ or has a temperature T of less than the threshold $T_1$, the component is detected to be in the passive state.

Typically, in the passive state, the component 146 is not used or is used very little. The expression used very little refers for example to the situation where the component 146 is on standby.

The component 146 is controllable and can be toggled, alternately, between its active state and its passive state.

Here, the component 146 is associated with a maximum temperature $T_{max}$. Typically, the temperature $T_{max}$ corresponds to a temperature beyond which the component 146 risks being damaged or beyond which its performance deteriorates. The threshold $T_1$ is strictly less than this temperature $T_{max}$.

Here, the value of the threshold $Q_1$ is chosen strictly greater than zero and, for example, greater than 0.1 mW or 1 mW or 10 mW.

The component 146 is designed such that the preponderance of the heat that it produces is evacuated by way of a heat evacuation face 148. Here, the face 148 is the upper face of the component 146.

A sensor 150 is provided to measure the temperature T of the component 146. This sensor 150 is connected to the control unit 52.

The component 146 toggles between its active and passive states in response to exterior events acquired by way of an interface 152. Here, it is the reception of these events which is used to detect that the quantity Q of heat produced per second is above the threshold $Q_1$. Stated otherwise, the reception of these events is used as being a physical magnitude representative of the quantity of heat produced per second by the component 146. More precisely, in this embodiment the reception of an event triggering intensive operation of the component 146 indicates that the quantity of heat that it produces per second exceeds the threshold $Q_1$. Conversely, as soon as an event stopping intensive operation or placing the component 146 on standby is received on the interface 152, the quantity Q is considered to be less than the threshold $Q_1$. This way of proceeding makes it possible to avoid resorting to a sensor of quantity of heat produced per second.

For example, the interface 152 is a man-machine interface or a socket for connection to an information transmission network or the like. The interface 152 is connected to the component 146 by way of an information transmission bus 156.

The module 140 is identical to the module 24 except that the electrocaloric capacitor 28 is replaced with an electrical energy storage device 160. For example, the device 160 is a capacitor of the same capacitance as the capacitor 28 but devoid of any electrocaloric property. The electrode 32 of the capacitor 26 is in conduction thermal contact with the face 148 of the component 146.

In this embodiment, the control unit 52 is embodied with the aid of a programmable electronic computer 162 able to execute instructions recorded on a support for recording information. For this purpose, the unit 52 also comprises a memory 164 comprising the instructions necessary for executing the method of FIG. 15.

The operation of the module 140 will now be described with the aid of the method of FIG. 15 and of the timecharts of FIG. 16.

During a step 184, the component 146 receives an activation event at an instant $t_{on}$. This event is received by way of the interface 152 and the bus 156.

During a step 186, immediately in response, the component 146 passes to a mode of intensive operation. Thereafter, it remains in this mode of intensive operation throughout the duration of the time interval $\Delta T_{on}$. Typically, this time interval lasts more than 1 ms and, generally, more than 100 ms or 1 s. Its duration is on the other hand generally less than an hour or 5 minutes.

Thereafter, during a step 188, the component 146 receives a deactivation event at an instant $t_{off}$. This event is received by way of the interface 152 and the bus 156.

During a step 190, immediately in response, the component 146 passes to standby. Thereafter, it remains on standby throughout the duration of the interval $\Delta T_{off}$. The duration of the interval $\Delta T_{off}$ is generally greater than or equal to the duration of the interval $\Delta T_{on}$. On standby, the heat exchanges with the exterior environment are sufficient for its temperature to decrease until the latter stabilizes around the ambient temperature.

On completion of step 190, the method returns to step 184. Thus, since the activation and deactivation events are received alternately, the component 146 regularly alternates between a mode of intensive operation and standby.

In parallel, during a step 194, at the instant $t_{on}$, the unit 52 detects the toggling to the active state. Accordingly, here, it detects the reception of the activation event and acquires the temperature measured through the sensor 150. The reception of the activation event is interpreted as signifying that the quantity Q of heat produced per second by the component 146 is above the threshold $Q_1$. If the temperature is below the threshold $T_1$, the toggling to the active state is not detected. In this case, the unit 52 acquires the temperature T at regular intervals to detect a subsequent toggling of the component 146 to the active state. If the acquired temperature T is above the threshold $T_1$, the active state of the component 146 is detected. In response to this detection, the unit 52 commands the circuit 50 to decrease the difference in potentials between the electrodes 32 and 34 of the capacitor 26. For this purpose, step 100 described previously is executed. This decrease in the difference in potentials causes a fall in the temperature of the electrocaloric material which is transmitted, by thermal conductivity, to the electrical component 146. This temperature fall limits or cancels the increase in the temperature of the component 146 when the latter is in its active state.

Figure 16:
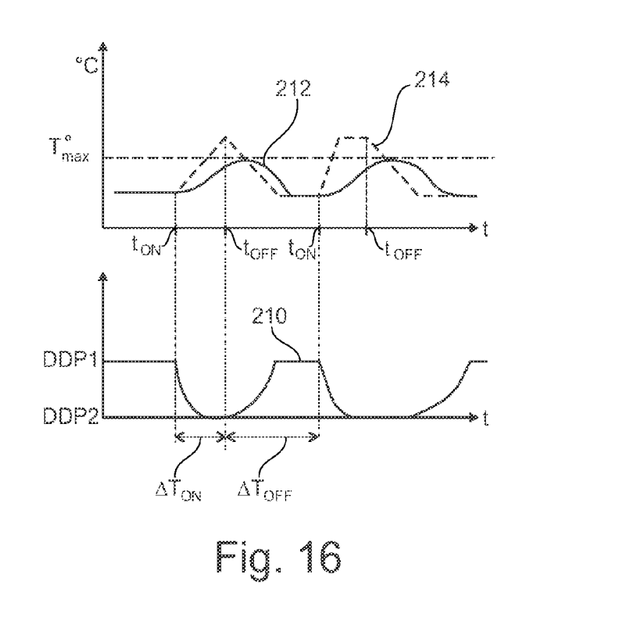
FIG. 16 is a timechart illustrating the evolution over time of a voltage of the module of FIG. 14 and of the temperature of an electronic component.

Here, the voltage V1 decreases from the value DDP1 to the value DDP2 (FIG. 16, bottom timechart).

Thereafter, during a step 196, the unit 52 maintains the difference in potentials equal to this value DDP2 as long as the toggling of the component 146 to the passive state is not detected. Accordingly, step 102 described previously is executed and the circuit 50 is maintained in the disabled state until the toggling of the component 146 to the passive state is detected Thereafter, during a step 198, the unit 52 detects the toggling of the component 146 from the active state to the passive state. As during step 194, accordingly, the unit 52 detects the reception of the event of deactivation of the component 146 at the instant $t_{off}$. At the same time, the unit 52 acquires the value measured by the sensor 150. As long as the measured value of the temperature T is above the threshold $T_1$, the toggling to the passive state is not detected.

Conversely, as soon as the measured value of the temperature T descends below the threshold $T_1$, the toggling to the passive state is detected. In response, the unit 52 commands the circuit 50 to again increase the difference in potentials between the electrodes 32 and 34. Accordingly, step 104 described previously is executed. This increase causes an increase in the temperature of the layer 36 and, by thermal conductivity, limits the decrease in the temperature of the component 146. Here, the voltage $V_1$ increases from the value DDP2 to the value DDP1.

During a step 200, when the difference in potentials attains the value DDP1 again, the unit 52 maintains this difference in potentials at this value as long as the component 146 remains in the passive state. Accordingly, step 106 described previously is executed. On completion of this step 200, the method then returns to step 194.

FIG. 16 represents two timecharts one above the other. In the bottom timechart, a line 210 represents the evolution over time of the voltage $V_1$ when the method of FIG. 15 is implemented.

Figure 15:
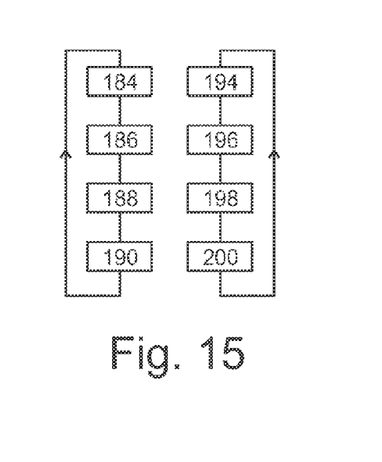
FIG. 15 is a flowchart of a method for limiting the temperature variations of an electronic component with the aid of the module of FIG. 14.

In the top timechart, a solid line 212 represents the evolution of the temperature of the component 146 when the method of FIG. 15 is implemented. A dashed line 214 represents the temperature of the component 146 in the case where the method of FIG. 15 is not implemented. As shown by the line 214, if the method of FIG. 15 is not implemented, the temperature of the component 146 exceeds the temperature $T_{max}$. Conversely, if the method of FIG. 15 is implemented, the temperature of the component 146 does not exceed this temperature $T_{max}$.

Thus, the method of FIG. 15 makes it possible to limit the temperature variations of the component 146 but does not make it possible to decrease its mean temperature over a long duration.

Figure 17:
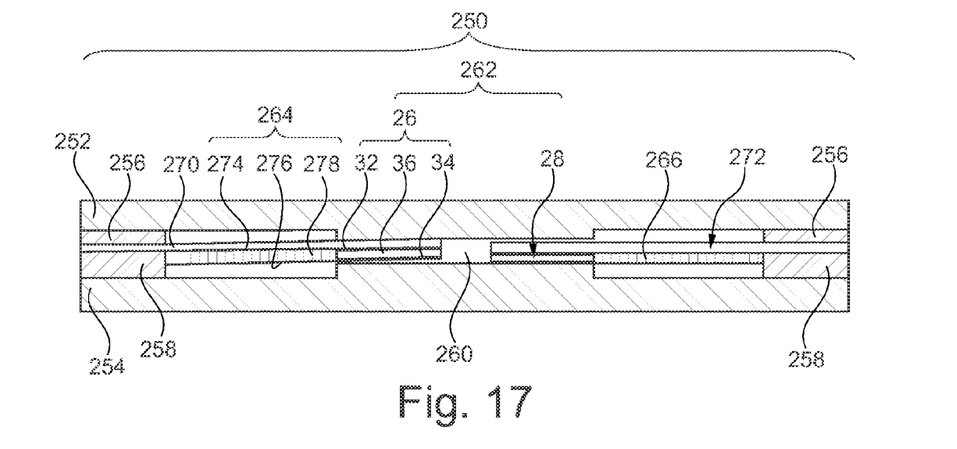
FIGS. 17 and 18 are schematic illustrations, in vertical section, of another embodiment of a system for transferring thermal energy between two media.
Figure 18:
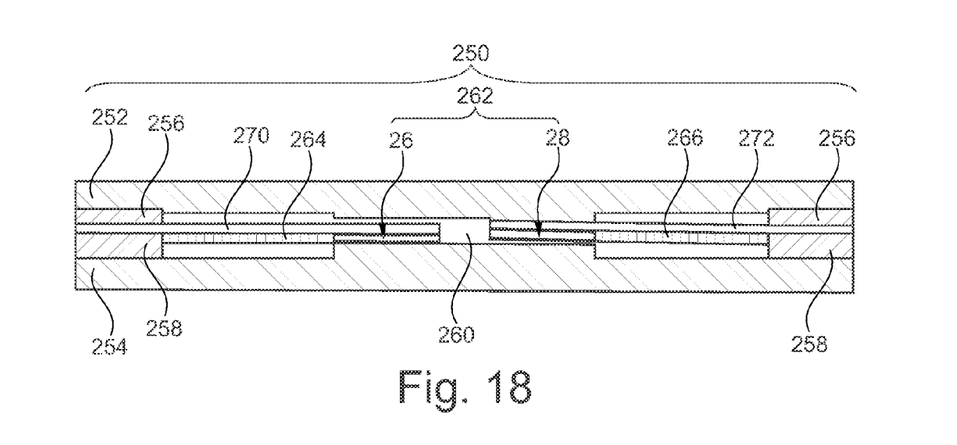

FIGS. 17 and 18 represent a system 250 for transferring thermal energy between media 252 and 254. In this embodiment, the media 252 and 254 are media in the solid state. Here they each take the form of a horizontal layer.

These media 252, 254 are thermally insulated from one another:

by two layers 256, 258 of thermally insulating material, that is to say a poor thermal conductor, and by a cavity 260.

Preferably, a vacuum is produced inside the cavity 260. For this purpose, it is hermetically insulated from any exterior medium.

The system 250 comprises a module 262 able to warm the medium 254 and, alternately, to cool the medium 252. This module 262 is embodied in accordance with the teachings given previously. Thus, this module is not described here in greater detail. Moreover, to simplify FIGS. 17 and 18, only the capacitors 26 and 28 of this module 262 have been represented.

In this embodiment, the transport device able to connect thermally, alternately, the capacitors 26 and 28 to the media 252 and 254 comprises two electromechanical actuators 264 and 266. Here, the actuator 264 is able to displace the capacitor 26 between:

a rest position, represented in FIG. 17, in which the capacitor 26 is connected by thermal conduction with the medium 252, and an active position, represented in FIG. 18, in which the capacitor 26 is connected by thermal conduction with the medium 254.

In a similar manner, the actuator 266 is able to displace the capacitor 28 between:

a rest position, represented in FIG. 18, in which the capacitor 28 is connected by thermal conduction with the medium 252, and an active position, represented in FIG. 17, in which the capacitor 28 is connected by thermal conduction with the medium 254.

Accordingly, the transport device also comprises two movable beams 270 and 272 housed inside the cavity 260. The capacitors 26 and 28 are fixed without any degree of freedom on a free end, respectively, of the beams 270 and 272. The opposite end of each beam is anchored without any degree of freedom between the layers 256 and 258. These beams extend essentially horizontally.

Here, the actuators 264 and 266 are able to bend, respectively, the beams 270 and 272 so as to displace the capacitors 26 and 28 between their active and rest positions. In this embodiment, the actuators 264 and 266 are piezoelectric actuators. For example, the actuator 264 comprises two electrodes 274 and 276 between which is interposed a piezoelectric material layer 278. The electrodes 274, 276 and the layer 278 are fixed without any degree of freedom on the beam 270 and essentially extend parallel to this beam in the direction of its greater length. Moreover, here, the electrodes 274 and 276 are electrically connected permanently, respectively, to the electrodes 32 and 34 of the capacitor 26 in such a way that the application of a difference in potentials between the electrodes 32 and 34 simultaneously causes:

a warming of the layer 36, and a deformation of the layer 278 which bends the beam 270 so as to displace the capacitor 26 from its rest position to its active position.

The actuator 266 is identical to the actuator 264 except that it is fixed on the beam 272 and its electrodes are permanently electrically connected to those of the capacitor 28. It will not therefore be described in greater detail.

During the operation of the system 250, the module 262 operates as described previously. However, in addition, during step 100 the decrease in the voltage between the electrodes of the capacitor 26 causes, simultaneously, its displacement from its active position to its rest position. In parallel, the capacitor 28 is displaced from its rest position to its active position on heating up. In the disabled state which follows, the capacitors 26 and 28 remain, respectively, in the rest and active positions. Thereafter, during step 104, the capacitors 26 and 28 are displaced by the actuators 264 and 266 in the reverse direction to what happens during step 100. Finally, throughout the duration of the following disabled state, the capacitors 26 and 28 remain, respectively, in the active and rest positions. This displacement cycle can be repeated a large number of times. During each cycle, the capacitors 26 and 28 transport heat from the medium 252 to the medium 254.

Figure 19:
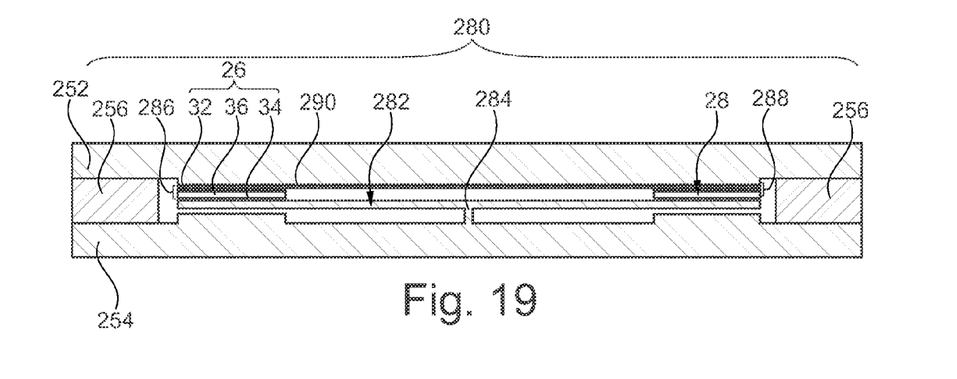
FIG. 19 is a schematic illustration, in vertical section, of another embodiment of the system of FIGS. 17 and 18.

FIG. 19 represents a system 280 for transferring thermal energy between the media 252 and 254. The system 280 is identical to the system 250 except that:

the insulating layer 258 is omitted, the beams 270, 272 are replaced with a spar 282 mounted rotatably about a central axis 284, and the piezoelectric actuators 264, 266 are replaced with electrostatic actuators 286, 288.

The capacitors 26 and 28 are fixed without any degree of freedom at a respective end of the spar 282. The electrode 32 of each of these capacitors is turned towards the layer 252. The central axis 284 extends horizontally parallel to the planes of the layers 252 and 254. Here, it passes through the centre of gravity of the spar 282.

The actuator 286 comprises the electrode 32, the layer 252 and a film 290 deposited on the layer 252 in front of the electrodes 32 of each of the capacitors 26, 28. The film 290 is made of electrically insulating and good thermal conducting material. The layer 252 and the spar 282 are made of electrically conducting or semi-conducting material. Here, the layer 252 and the spar 282 are electrically grounded. Hence, when a positive voltage, greater than that present at the same instant on the electrode 32 of the capacitor 28, is applied to the electrode 32 of the capacitor 26 then an electrostatic force displaces the capacitor 26 to a rest position in which its electrode 32 is directly in contact with the film 290. This displacement also brings about the displacement of the capacitor 28 to an active position in which its electrode comes into thermal contact by conduction with the layer 254.

The reverse displacement of the spar 282 is obtained by applying a positive voltage to the electrode 32 of the capacitor 28, greater than that applied at the same instant to the electrode 32 of the capacitor 26. The remainder of the operation of the module 262 is identical to what was described previously.

Numerous other embodiments are possible. For example, the switches such as the switches K1 and K2 can be MOSFET, JFET, bipolar, IGBT transistors or even mechanical relays.

To simplify the transfer circuit, the inductor 70 can be omitted. In this case, the energy losses during the transfer of the electrical energy between the electrocaloric capacitor and the energy storage device increase substantially, thereby reducing the efficiency of this module. However, even without this inductor, the efficiency of this module remains very markedly greater than that of the known modules in which the electrical energy stored in the electrocaloric capacitor is not reused during a subsequent cycle. This embodiment, without inductor, therefore makes it possible to very substantially reduce the bulkiness of the transfer circuit to the detriment of a decrease in the efficiency of the module.

Whatever the embodiment of the transfer circuit, the control unit can be embodied in the form described with reference to FIG. 14.

The system 2 can be used to warm the interior medium rather than to cool it.

Accordingly, it suffices to reverse the commands described with reference to the timecharts of FIGS. 6 to 9. Stated otherwise, it is necessary to command the circuit 50 so as to warm the heat-transfer fluid which heads towards the medium 6 instead of cooling it as described previously.

The interior and exterior media may be solids or liquids.

The module 24 of the system 2 may be replaced with a first and a second distinct module. The first module is used solely to warm and, alternately cool, the interior of the pipe 16 while the second module is used solely to warm and, alternately cool, the interior of the pipe 18. These first and second modules are for example identical to the module 140 described with reference to FIG. 14. Thus, it is possible to command a cooling or warming of one of the pipes 16 and 18 independently of the cooling or warming commanded in the other of these pipes. Stated otherwise, this also makes it possible to no longer operate the first and second modules in phase opposition.

In the system 2, the pipe 16 can be omitted. For example, it is replaced with a first and a second distinct reservoir of heat-transfer fluid. When the pump 20 sucks the heat-transfer fluid from the exchanger 12 towards the exchanger 14 through the pipe 18, the first reservoir empties and the second reservoir fills. Conversely, when the pump 20 sucks the heat-transfer fluid from the exchanger 14 towards the exchanger 12, it is the second reservoir which empties while the first reservoir fills. The operation of this system without a second pipe is thereafter deduced from what was explained previously. Moreover, in the particular case where the pipe 16 is omitted, the electrocaloric capacitor 26 can be replaced with any electrical energy storage device such as an electrical capacitor devoid of any electrocaloric property. Moreover, this electrical energy storage device can be disposed anywhere in the module for warming and cooling.

In the module 140, the device 160 can also be an electrocaloric capacitor or a battery or any other means of storing electrical energy.

The capacitors 26 and 28 are not necessarily identical. For example, as a variant, they do not have the same capacitance. This does not change the manner of operation described previously save for the value of the voltages observed between the electrodes of these electrocaloric capacitors. Moreover, in this case, the capacitor of larger capacitance never discharges completely.

In order to be connected by thermal conduction with the heat-transfer fluid, the capacitors 26, 28 can also be fixed on the exterior face of the walls of the pipes rather than inside these pipes. In this case, preferably, the walls of the pipes are made of a good thermal conducting material.

Other embodiments of the capacitor 26 or 28 are possible. For example, such a capacitor can also be produced as described in the article A5. In this article, the capacitor is produced according to the traditional method for fabricating multilayer capacitors. The capacitor 26 or 28 can also be produced like film capacitors formed by winding a multilayer film produced by the superposition of a metallic layer, of the dielectric layer and of another metallic layer. The metallic layers correspond to the electrodes. In this case, the thickness of the dielectric layer is often greater than 2 μm or 5 μam and, preferably, less than 148 μm or 15 μm.

Each electrocaloric capacitor can be formed of a single capacitive block or, on the contrary, of several capacitive blocks connected together in parallel or in series. It is also possible to replace the electrocaloric capacitor with several electrocaloric capacitors connected in parallel or in series. In particular, the module can comprise either in the pipe 16 or else in the pipe 18 several electrocaloric capacitors in series and/or parallel.

As a variant, a negative electrocaloric material can be used to produce the layer 36 of the electrocaloric capacitors. The control unit 52 must then be adapted for causing an increase in voltage between the electrodes of this capacitor when it is desired to cool the heat-transfer fluid and a fall in this voltage between these same electrodes when it is desired to warm the heat-transfer fluid. By taking note of this remark and of the teachings described previously, it is possible to produce systems for thermal energy transfer using capacitors with negative electrocaloric material rather than the capacitors with positive electrocaloric material as described previously.

As a variant, the transfer circuit comprises only a single source. One of the voltage sources 72 or 82 is omitted. In this case, a single of the two capacitors is recharged but this does not prevent the losses of the circuit 50 from being compensated and therefore stable operation from being obtained.

In another variant, the voltage sources are not connected in series with the capacitors to be recharged but in parallel with the electrodes of these capacitors.

In another embodiment, the diodes 86 and 88 are omitted. This does not prevent operation of the thermal energy transfer system. However, the voltage across the terminals of one of the capacitors 26 and 28 then becomes progressively negative whereas the voltage across the terminals of the other of these capacitors then becomes progressively positive. The voltages $V_1$ and $V_2$ are then of opposite sign.

The thermal energy transfer system 250 can be simplified by omitting the actuator 266 and the beam 272. In this case, the capacitor 28 is replaced with an electrical energy storage device devoid of any electrocaloric property.

Other embodiments of the actuators 264, 266, 286, 288 are also possible. For example, an electromagnetic or thermal actuator can be used.

As a variant, the actuators displace the layers 252 and 254 instead of displacing the capacitors 26 and 28 so as to transfer the heat from one layer to the other.

It is not necessary for the actuators of the systems 250, 280 to be connected in series with the electrodes of the capacitors 26 and 28. As a variant, the actuators are powered on the basis of an electrical circuit electrically independent of that comprising the capacitors 26 and 28.

The system 250 or 280 can also be implemented without using an energy storage device to recover and then reuse the energy stored up in the electrocaloric capacitor. In the latter case, the electrical energy transfer circuit and/or the electrical energy storage device are omitted.

The invention claimed is:

1. An apparatus comprising a module for warming and, alternately, for cooling, said module comprising an electrocaloric capacitor, a storage device, a transfer circuit, and a control unit, wherein the transfer circuit comprises an inductor and a first switch, wherein the storage device is an electrical-energy storage device that stores electrical energy, wherein the first switch is a controllable switch, wherein the transfer circuit is controllable, wherein the transfer circuit transfers electrical energy between the electrocaloric capacitor and the storage device, wherein the inductor is connected between the electrocaloric capacitor and the storage device, wherein the first switch is configured to toggle the transfer circuit between an energy-recovery state, a disabled state, and an energy-release state, wherein, in the energy-recovery state, the first switch permits current to flow from the electrocaloric capacitor to the storage device through the inductor, thereby decreasing a voltage between electrodes of the electrocaloric capacitor and transferring at least some electrical energy stored by the electrocaloric capacitor to the storage device, wherein, in the disabled state, the first switch electrically isolates the electrocaloric capacitor from the storage device, wherein, in the energy-release state, the first switch permits current from the storage device to flow to the electrocaloric capacitor through the inductor so as to increase the voltage between the electrodes of the electrocaloric capacitor by transferring electrical energy stored in the storage device to the electrocaloric capacitor, wherein the control unit is programmed to control the first switch so as to cause the transfer circuit to toggle successively into the following states and in the following order: the energy-recovery state, the disabled state, the energy-release state, and the disabled state, wherein the energy-release state is maintained for a first duration, wherein the energy-recovery state is maintained for a second duration, wherein said control unit is programmed to control the first switch so as to leave the transfer circuit in the disabled state for a duration that is greater than the first duration and greater than the second duration.

2. The apparatus of claim 1, wherein said transfer circuit comprises a voltage source that is connected in series with the electrocaloric capacitor, wherein the voltage source is a controllable DC voltage source, wherein the voltage source is configured to generate one of a first voltage and a second voltage, wherein said first voltage is a voltage from a first range wherein said second voltage is a voltage from a second range, wherein said first range consists of all voltages greater than or equal to zero, wherein said second range consists of all voltages that are less than or equal to zero, wherein at least one of the first and second voltages is non-zero, wherein the control unit is configured to cause the voltage source to generate the first voltage if the current through the electrocaloric capacitor is greater than zero, and wherein the control unit is configured to cause the voltage source to generate the second voltage if the current through the electrocaloric capacitor is less than zero.

3. The apparatus of claim 1, further comprising a diode, wherein said diode is connected in parallel with the electrocaloric capacitor so as to prevent a negative voltage between the electrodes of the electrocaloric capacitor.

4. The apparatus of claim 1, wherein the transfer circuit comprises a first diode, a second switch, and a second diode, wherein the first switch has first terminals, wherein the second switch has second terminals, wherein the second switch is a controllable switch, wherein the first switch is connected in series with the first diode, wherein the second switch is connected in series with the second diode, wherein the first diode is connected in parallel between the second terminals of the second switch and second diode is connected in parallel between the first terminals of the first switch, and wherein the first and second diodes are connected in series in mutually reverse directions thereby preventing a current from passing from the first diode to the second diode or from the second diode to the first diode.

5. The apparatus of claim 1, wherein the energy-storage device comprises a capacitor for storing energy and wherein the inductor is connected between the electrocaloric capacitor and the capacitor of the energy-storage device.

6. The apparatus of claim 1, wherein the electrical energy-storage device has an electrical-energy storage capacity that is greater than or equal to an electrical-energy storage capacity of the electrocaloric capacitor.

7. The apparatus of claim 1, wherein the energy-storage device comprises an electrocaloric capacitor for storing energy.

8. The apparatus of claim 1, further comprising a transport device able to thermally connect the module to a hot medium when the module warms and, alternately, to a cold medium when the module cools.

9. The apparatus of claim 8, wherein the transport device comprises a fluidic circuit, wherein the fluidic circuit comprises a first heat-exchanger, a second heat-exchanger, a pipe, and a pump, wherein the first heat exchanger is in direct contact with the hot medium, wherein the second heat exchanger in direct contact with the cold medium, wherein the pipe provides a fluid interconnection between the first and second heat exchangers, and wherein the pump is controllable so as to cause the flow in one direction and, alternately in an opposite direction, of a heat-transfer fluid inside the pipe, and wherein the electrocaloric capacitor of the module is situated inside the pipe or in direct contact with a wall of this pipe for warming and, alternately, cooling the pipe so as to cool and, alternately, to warm the heat-transfer liquid that flows inside the pipe.

10. The apparatus of claim 8, wherein the transport device comprises a first and a second pipe, wherein the first pipe provides a fluid connection between an output of the first heat exchanger and an input of the second heat exchanger, wherein the second pipe provides a fluid connection between an output of the second heat exchanger and an input of the first heat exchanger, wherein the storage device of the module comprises another electrocaloric capacitor situated inside the second pipe or in direct contact with a wall of this second pipe, and wherein the control unit is further programmed to control the pump so as to reverse the direction of flow of the heat-transfer liquid each time that the transfer circuit passes from the disabled state to the energy-release state and from the disabled state to the energy-recovery state.

11. The apparatus of claim 8, wherein the transport device comprises a mechanism able to alternately displace the electrocaloric capacitor of the module with respect to the hot and cold media between first and second positions, wherein, in the first position, the electrocaloric capacitor is directly in contact with the hot medium and is thermally insulated from the cold medium, and wherein, in the second position, the electrocaloric capacitor is directly in contact with the cold medium and thermally insulated from the hot medium.

12. A method for operating a module for warming and, alternately, for cooling, said module comprising an electrocaloric capacitor, a storage device that stores electrical energy, and a controllable transfer circuit having a switch and an inductor, said method comprising: using the switch, tog ling the transfer circuit into an energy-recovery state thereby permitting current flow from the electrocaloric capacitor to the storage device through the inductor, as a result of which at least some electrical energy stored by the electrocaloric capacitor is transferred to the storage device and a voltage between electrodes of the electrocaloric capacitor decreases; maintaining the energy-recovery state for a first duration; using the switch, toggling the transfer circuit from the energy-recovery state into a disabled state in which the switch electrically isolates the electrocaloric capacitor from the storage device; leaving the transfer circuit in the disabled state for a duration that is greater than the first duration and greater than a second duration; toggling the transfer circuit from the disabled state to an energy-release state in which the switch permits current flow from the storage device to the electrocaloric capacitor through the inductor, as a result of which electrical energy stored in the storage device is transferred to the electrocaloric capacitor and a voltage between the electrodes increases; maintaining the energy-release state for the second duration; toggling the transfer circuit from the energy-release state back to the disabled state; and leaving the transfer circuit in the disabled state for a duration that is greater than the first duration and greater than the second duration.

13. The method of claim 12, wherein the first and second durations are greater than 100 milliseconds.

14. The method of claim 12, further comprising controlling a DC voltage source that is connected in series with the electrocaloric capacitor, wherein the DC voltage source generates one of a first voltage and a second voltage, wherein said first voltage is within a first range, wherein said second voltage is within a second range, wherein said first range consists of voltages that are greater than or equal to zero, wherein said second range consists of voltages that are less than or equal to zero, wherein controlling said DC voltage source comprises causing said DC voltage source to generate said first voltage when current passing through said electrocaloric capacitor is greater than zero and causing said DC voltage source to generate said second voltage when current passing through said electrocaloric capacitor is less than zero, and wherein at least one of said first and second voltages is non-zero.

15. A manufacture comprising a non-transitory computer-readable medium having encoded thereon instructions for operating a module for warming and, alternately, for cooling, said module comprising an electrocaloric capacitor, a storage device that stores electrical energy, and a controllable transfer circuit having a switch and an inductor, wherein said instructions cause said module to execute a method comprising: using the switch, toggling the transfer circuit into an energy-recovery state thereby permitting current flow from the electrocaloric capacitor to the storage device through the inductor, as a result of which at least some electrical energy stored by the electrocaloric capacitor is transferred to the storage device and a voltage between electrodes of the electrocaloric capacitor decreases; maintaining the energy-recovery state for a first duration; using the switch, toggling the transfer circuit from the energy-recovery state into a disabled state in which the switch electrically isolates the electrocaloric capacitor from the storage device; leaving the transfer circuit in the disabled state for a duration that is greater than the first duration and greater than a second duration; toggling the transfer circuit from the disabled state to an energy-release state in which the switch permits current flow from the storage device to the electrocaloric capacitor through the inductor, as a result of which electrical energy stored in the storage device is transferred to the electrocaloric capacitor and a voltage between the electrodes increases; maintaining the energy-release state for the second duration; toggling the transfer circuit from the energy-release state back to the disabled state; and leaving the transfer circuit in the disabled state for a duration that is greater than the first duration and greater than the second duration.

* * * * *